UNITED STATES PATENT OFFICE.

JOHN WILKERSON LOWMAN, OF CHATTANOOGA, TENNESSEE.

PAINT COMPOSITION.

No Drawing.   Application filed May 22, 1925. Serial No. 32,189.

This invention relates to paints and has for its object the provision of a composition for coating calsomined or plastered walls or for coating walls formed of brick, stone or concrete and for protecting railroad ties and timbers of any kind against the elements which cause decay.

A further object of the invention is the provision of a paint for coating railroad ties or timbers which are exposed to the influence of the salt air of the gulf, seas or ocean and more particularly to such seas or gulfs in the southern waters in order to prevent the toredo and barnacles from affecting such materials.

A further object of the invention is the provision of a paint having certain inorganic compounds which are not oxidized by exposure to the elements and which are capable of being mixed with water and sprayed or applied by a brush to wood of all kinds for exterior use and in which the paint not only forms a protective coating but partially impregnates the wood at its surface to render such wood impervious to the attacks of the toredo and barnacles.

This invention will be best understood from a consideration of the following detailed description; nevertheless it is to be understood that the invention is not confined to the disclosure, being susceptible of such changes and modifications which shall define no material departure from the salient features of the invention as expressed in the appended claim.

In carrying out my invention I employ a pigment of any well known type such as ocher, bauxite, kaoline, vermilion, white lead, zinc or chromium or any well known filler that may be worked in with drying oils. To any one of the above named ingredients is added calcium sulphate which is well burned preliminarily to the mixing and sodium silicate. The ingredients are thoroughly mixed and the mass is finely pulverized in a mill and water is added in sufficient quantities and thoroughly incorporated in the pulverized material in the usual paint mill. The quantity of water added will be sufficient to be able to apply the paint readily by a brush or by means of a spray.

The ingredients are mixed in the following proportions, that is, 80% filler, 10% calcium sulphate, and 10% sodium silicate.

It will be readily seen that by the use of such ingredients thoroughly incorporated and mixed with water to form a paint that I have provided a composition which will not be acted upon when exposed to the elements and thereby be oxidized to render the paint valueless in a short period of time. The coat of paint readily dries and forms a hard coat having an excellent smooth finish.

This paint is also applicable for use in painting automobiles and Pullman cars.

What I claim is:

A paint comprising 80 per cent of a filler such as white lead, 10 per cent of calcium sulphate, 10 per cent of sodium silicate, and sufficient water for rendering the paint workable with a brush or spray.

JOHN WILKERSON LOWMAN.